Figure 1:
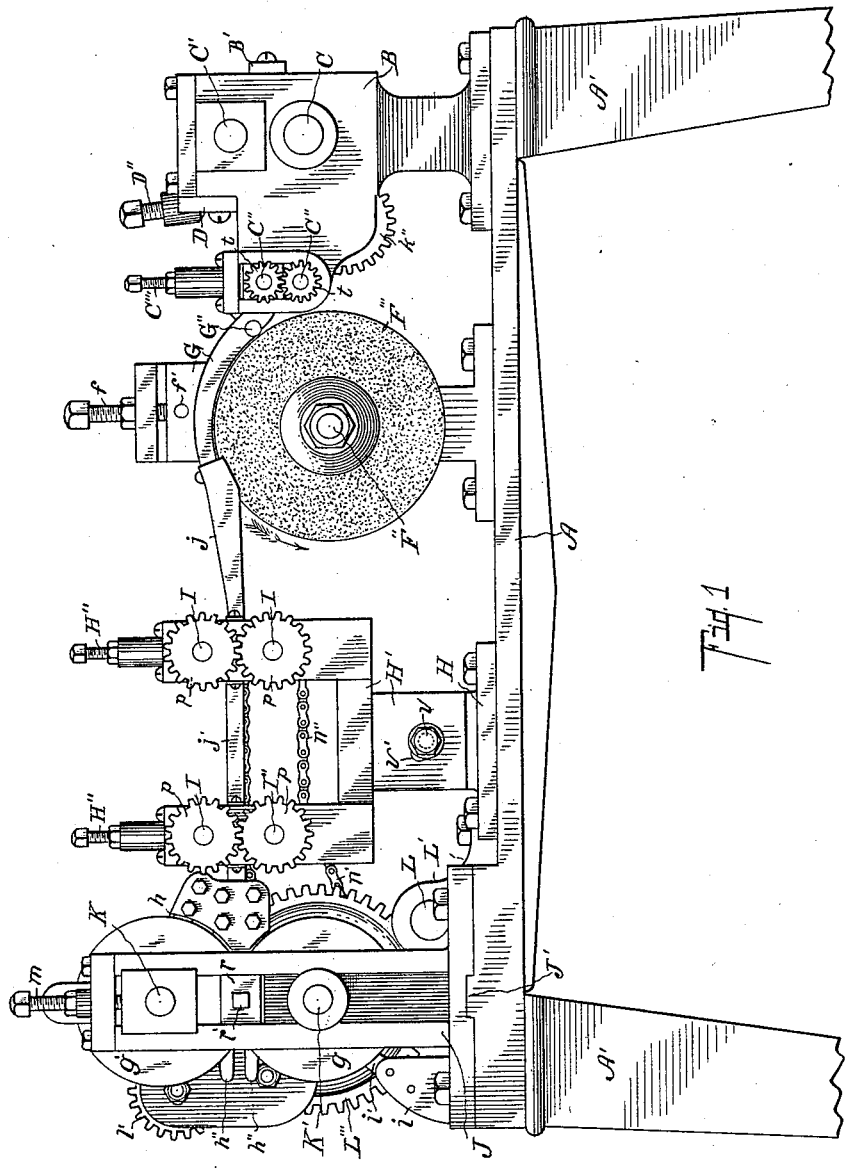

No. 698,883. Patented Apr. 29, 1902.
W. WEBSTER.
MACHINE FOR PREPARING QUILL SUBSTANCE.
(Application filed Apr. 29, 1901.)

(No Model.) 5 Sheets—Sheet 1.

Witnesses: Inventor:
Anna Sandy. William Webster
Otis A. Earl. By Fred L. Chappell
Atty.

THE NORRIS PETERS CO., PHOTO-LITHO., WASHINGTON, D. C.

No. 698,883. Patented Apr. 29, 1902.
W. WEBSTER.
MACHINE FOR PREPARING QUILL SUBSTANCE.
(Application filed Apr. 29, 1901.)

(No Model.) 5 Sheets—Sheet 2.

Witnesses:
Anna Sandy
Otis A. Earl

Inventor,
William Webster
By Fred L. Chappell
Atty.

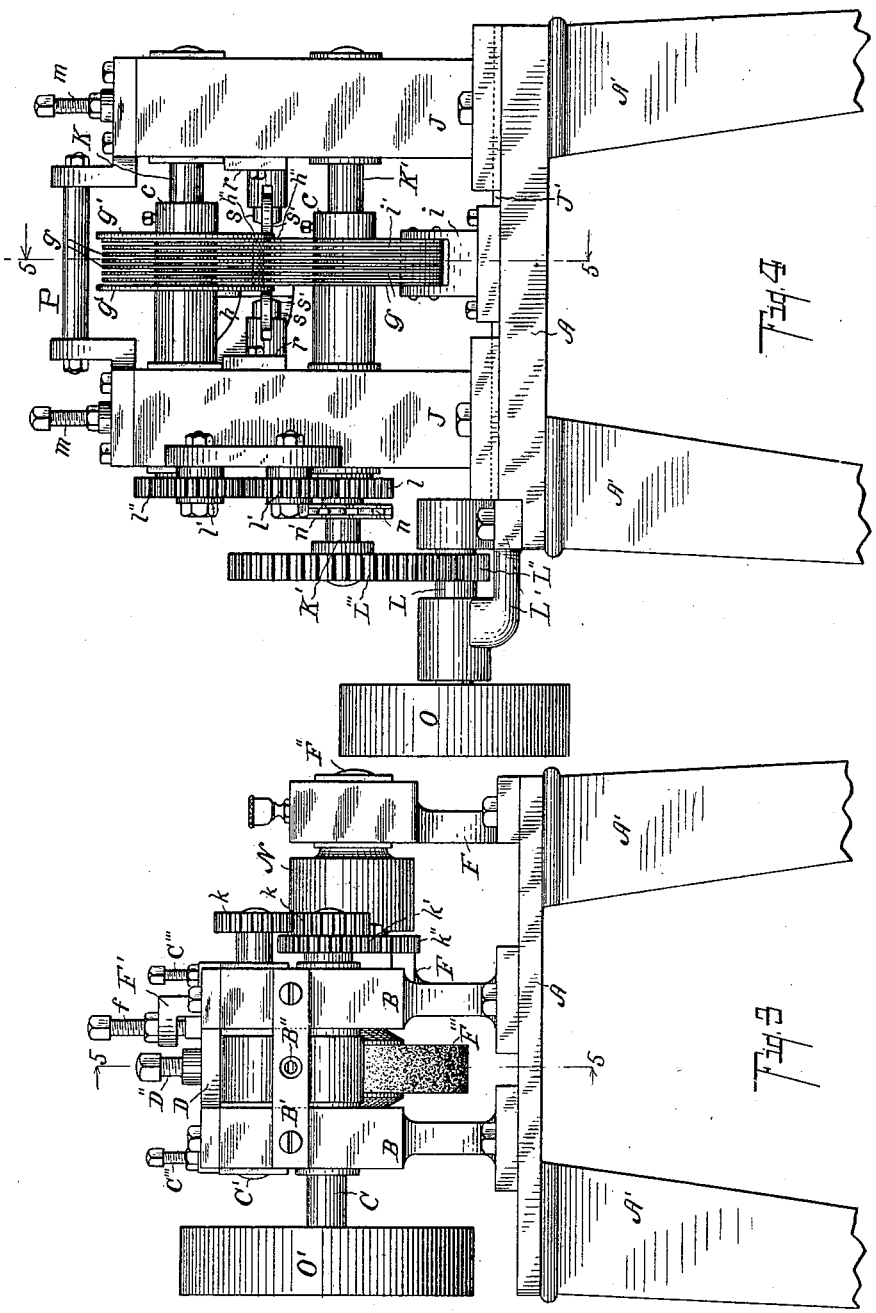

No. 698,883. Patented Apr. 29, 1902.
W. WEBSTER.
MACHINE FOR PREPARING QUILL SUBSTANCE.
(Application filed Apr. 29, 1901.)
(No Model.) 5 Sheets—Sheet 4.
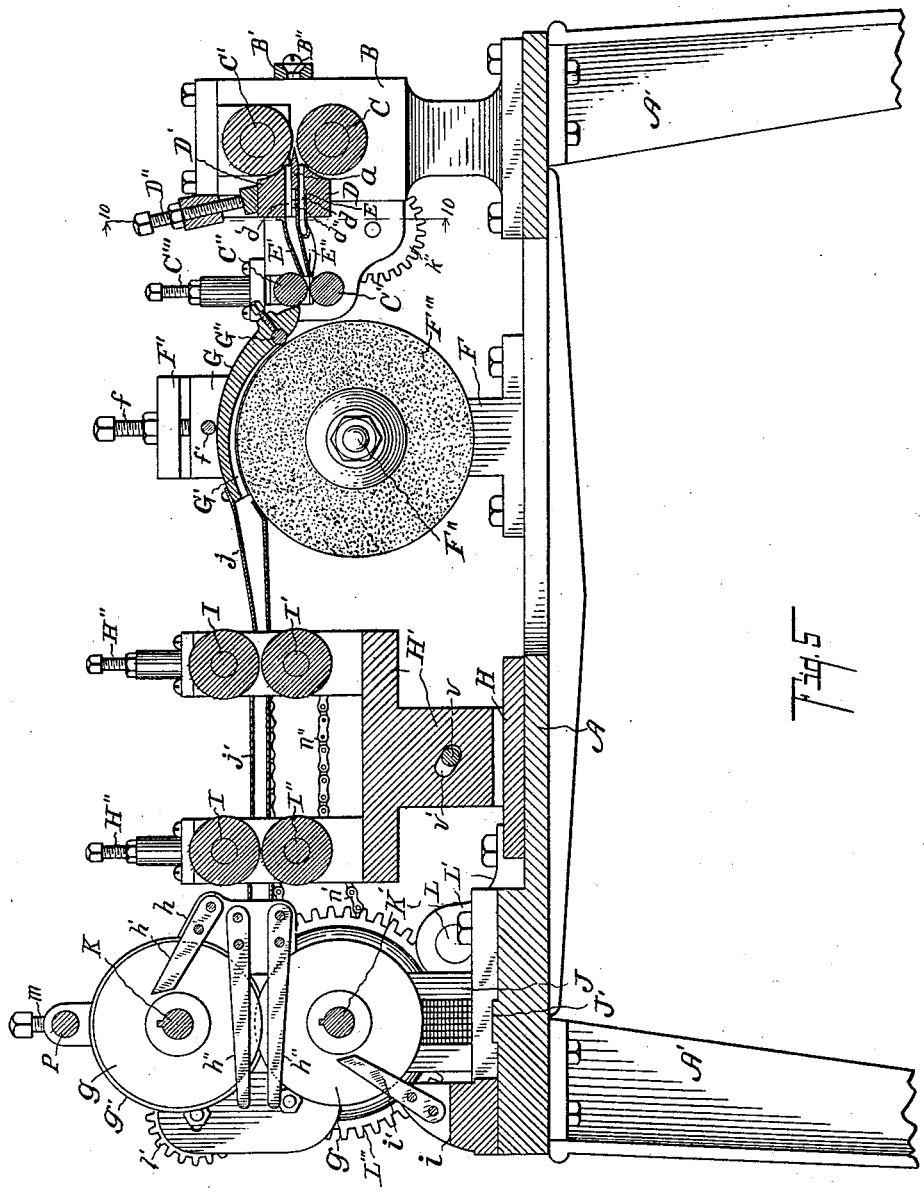
Witnesses:
Anna Sandy
Otis A. Earl
Inventor,
William Webster
By Fred L. Chappell
Att'y No. 698,883. Patented Apr. 29, 1902.
W. WEBSTER.
MACHINE FOR PREPARING QUILL SUBSTANCE.
(Application filed Apr. 29, 1901.)
(No Model.) 5 Sheets—Sheet 5.
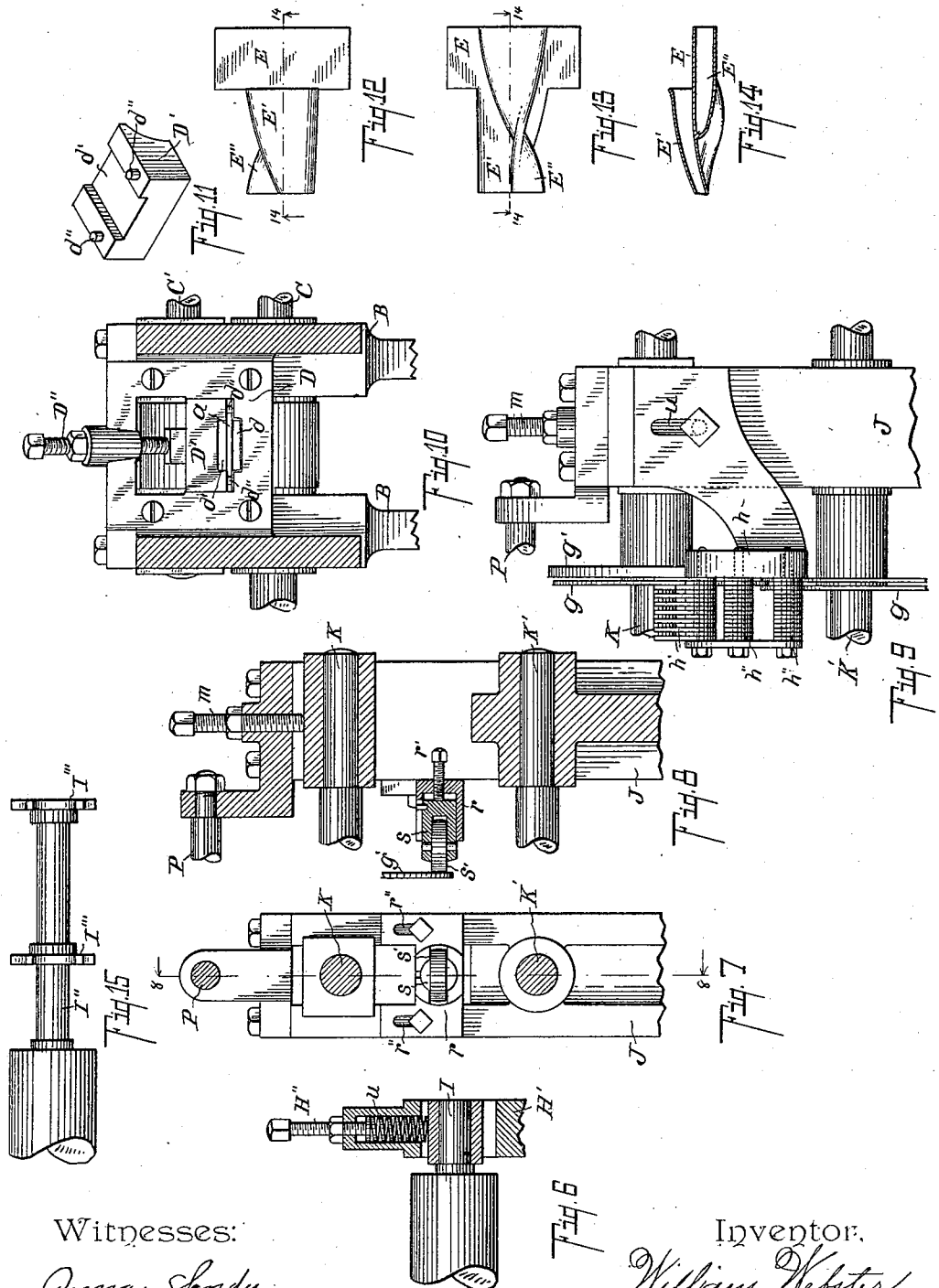
Witnesses:
Anna Sandy
Otis A. Earl
Inventor,
William Webster
By Fred L. Chappell
Atty.

UNITED STATES PATENT OFFICE.

WILLIAM WEBSTER, OF PORTER, INDIANA, ASSIGNOR TO THE WARREN FEATHERBONE COMPANY, OF THREEOAKS, MICHIGAN.

MACHINE FOR PREPARING QUILL SUBSTANCE.

SPECIFICATION forming part of Letters Patent No. 698,883, dated April 29, 1902.

Application filed April 29, 1901. Serial No. 58,013. (No model.)

*To all whom it may concern:*

Be it known that I, WILLIAM WEBSTER, a citizen of the United States, residing at the village of Porter, in the county of Porter and State of Indiana, have invented certain new and useful Improvements in Machines for Preparing Quill Substance, of which the following is a specification.

This invention relates to improvements in machines for preparing quills. In the method heretofore employed for this purpose a machine has been made use of, first, for splitting the quills. A second machine has then been made use of for grinding away the pith. A third machine has then been made use of for slitting the enamel portion of the fiber.

It is a prime object of this invention to produce a machine which after the quill has been introduced will operate automatically and, first, split the quill; second, remove the pith therefrom, and, third, reduce or slit the same into fiber.

The invention also relates to improvements resulting in a machine which is more effective, convenient, and economical in splitting the quills, in removing the pith from the same, and is also more practical and effective in reducing the shell or enamel portion to fiber.

The object of the invention, therefore, is to provide an organized machine which shall perform the functions of several machines and which shall be more effective in its details.

The special objects of the various parts and organisms will appear definitely in detail from the description to follow, and I do not attempt to enumerate them in detail at this point.

I accomplish the objects of my invention by the devices and means described in this specification.

The invention is clearly defined and pointed out in the claims.

A structure embodying all of the features of my invention is fully illustrated in the accompanying drawings, forming a part of this specification, in which—

Figure 2:
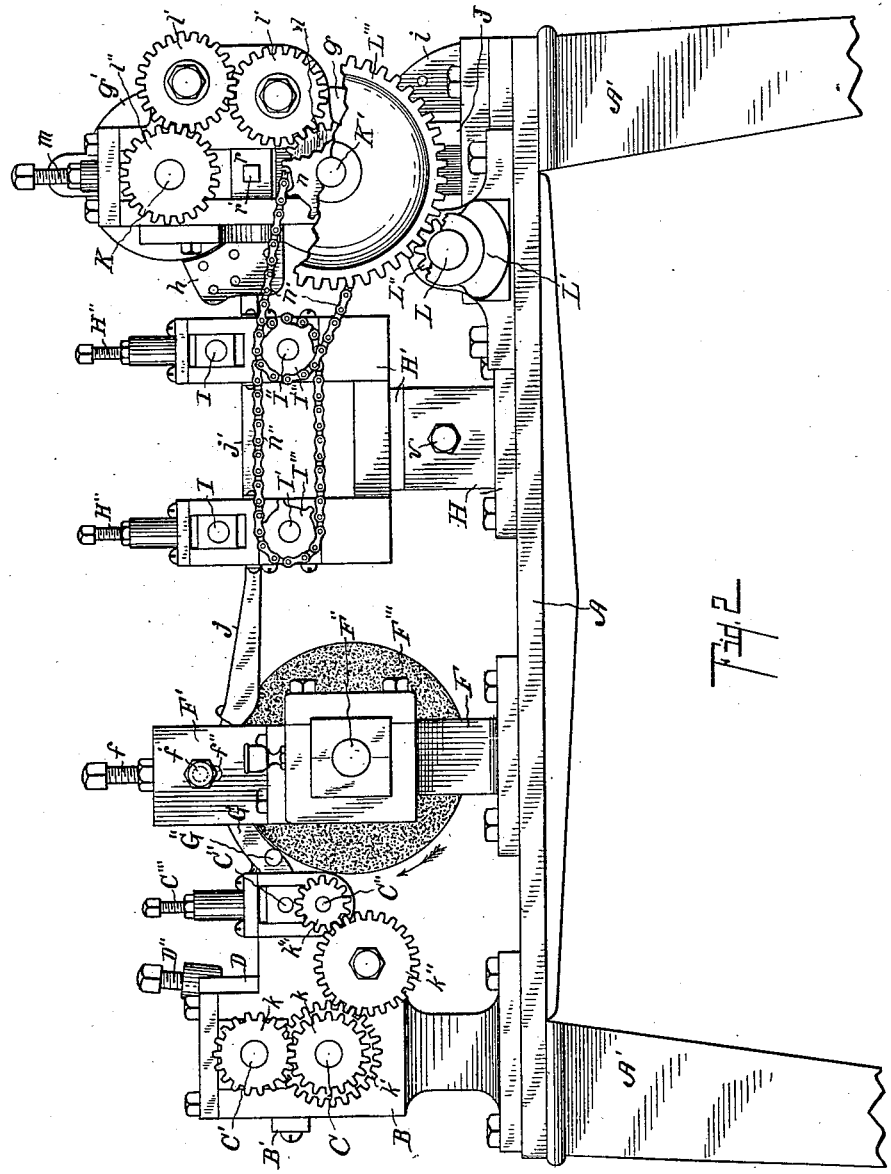

Figure 1 is a left-hand side elevation of the machine. Fig. 2 is a right-hand side elevation of the machine. Fig. 3 is a front end elevation of the machine. Fig. 4 is a rear end elevation of the machine. Fig. 5 is a vertical longitudinal detail sectional elevation taken on a line corresponding to lines 5 5 of Figs. 3 and 4, showing details of construction and of the arrangement of parts. Fig. 6 is a detail sectional view showing the adjusting means for the various feed-rollers of the machine. Fig. 7 is an enlarged detail view showing one of the guides for retaining the fibering-disks in position. Fig. 8 is a detail sectional view of the same, taken on line 8 8 of Fig. 7. Fig. 9 is a detail view showing the manner of supporting the guides and cleaners for the fibering-disks. Fig. 10 is an enlarged detail sectional view taken on the line 10 10 of Fig. 5, showing the arrangement of parts for holding the splitting-knife in position and adjusting the same. Fig. 11 is an inverted detail perspective view of the knife-retaining cap-block D'. Fig. 12 is an enlarged detail plan view of the guides for the halves of the split feather. Fig. 13 is an inverted plan view of the same. Fig. 14 is a detail sectional view taken on links 14 14 of Figs. 12 and 13. Fig. 15 is an enlarged detail view of the shaft I", showing the shaft with a pair of sprockets I''' I'''.

In the drawings all of the sectional views are taken looking in the direction of the little arrows at the ends of the section-lines, and similar letters of reference refer to similar parts throughout the several views.

Referring to the lettered parts of the drawings, A is a suitable base on which the remaining parts of the machine are supported. This base is preferably supported on legs A' A', which support it at a proper height for the convenience of the operator. To the front of the machine are brackets B B, containing journal-bearings, which receive the shafts C C', which carry feed-rolls for feeding quills into the machine. These feed-rolls are adjustable to and from each other to properly grasp and carry forward quills that are fed between them, the quills being fed through a suitable throat B", formed in a cross-piece B', the object of this being to prevent the operator attempting to feed more than one quill at a time to the machine. Back of these feed-rollers is a suitable block D and a cap-block D', which fits onto the same. Grooves $d\ d'$ in said blocks form a throat therethrough. A knife-blade $a$ is held between the blocks D D', and little pins $d''\ d''$ are on the under side of the block D' and hold the same properly spaced from the lower block D to properly clamp the knife. These blocks are supported adjustably on the rear of the brackets B by means of suitable screws, as clearly appears in the enlarged view, Fig. 10, which illustrates a rear view of the same with the quill-guide removed. The set-screw D'', with a suitable lock-nut, serves to clamp the cap-block D' securely in position.

The guide for the split quills consists of a straight tubular portion E' and a spiral portion E''', which operates to deliver the halves of a quill side by side, the spiral portion of the guide E'' turning the under portion of the quill after it is split completely over, so that the pith side is down and the outer portion is up. This guide is held by a suitable flange or tongue E, which fits between the blocks D D' against the back of the knife $a$, so that the halves of the quill will be properly delivered to the guide. Adjacent to this guide is a small pair of feed-rolls C'' C'', which grasp the divided halves of the quill and carry them forward. These rolls are adjustable to and from each other by suitable set-screws C''' C''' and an adjustable boxing like that detailed in Fig. 6. The rolls C C' and C'' C'' are suitably geared together and operated by the gears $k\ k'\ k''\ k'''$, which are driven from pulley O' on shaft C.

An emery-wheel F''' is supported on a suitable axis or shaft F'', carried by a bracket F in proper position to receive the divided quills on its periphery toward its upper side. A guide G is pivoted at this point, which is considerably separated from the emery-wheel and is provided with a removable transverse steel pin G'', which comes into close proximity with the wheel at the front of the guide. This pin serves to form a projection in close proximity to the grinding-wheel. It is removable and easily renewable when worn. The quill receives a sharp bend at this point that facilitates the removal of the pith. The guide G is adjustable up and down by the set-screw $f$ through the cap F' and screw $f'$ in the slot $f''$ through the bracket F. (See Figs. 2, 3, and 5.) The emery-wheel is driven by pulley N. A tubular guide $j$ extends from the emery-wheel F''' rearwardly and delivers the quills from which the pith has been ground by the emery-wheel to pairs of feed-rolls I I', which are connected together and operated by suitable sprocket-wheels I''' I''' and sprocket-chains $n'\ n''$, a guide $j'$ being between these feed-rolls. The feed-rolls are supported adjustably on a bracket H by suitable supporting-block H' by bolt $v$ in slot $v'$, so that the clean quills can properly be delivered to the fibering-disks. Only one of the rolls of each set of rolls needs to be actuated. The pressure of the upper pair I I serves to insure their actuation. These rolls are under spring-pressure by having their ends journaled in suitable boxes which play up and down in suitable guides in the block H'. Springs $u$, which are acted upon by set-screws H'', (see Fig. 6,) serve to put the necessary tension upon the same.

To the rear of the machine are brackets J J, suitably retained in position by a transverse rib or way J', fitting into a groove in the bottom of the same. These brackets are held adjustably in position by suitable set-screws and are coupled at the top by the bolt P. (See Fig. 4.) Transverse shafts K K' extend through suitable bearings in each of these brackets J. These shafts are shouldered, and adjustable collars $c\ c$ fit upon the reduced portions. (See Fig. 4.) At one end these shafts are suitably geared together by gears $l\ l'\ l'\ l''$, the gears $l'$ being idlers to permit the adjustment to and from each other of the shafts K K'. This part of the machine is driven by the pulley O on shaft L by gear L'. (See Figs. 2 and 4.) The shafts K K' are provided with suitable keys, and onto these are fitted disks $g$, having square cutting edges. There are small washers between these disks. The disks on the shafts K' interlap with the disks on the shaft K, so that the cutting edges thereof approximate each other and act as rotary shears in cutting a strip of quill into fiber. Heavy stiff disks $g'$ are on each side of the disks on the shaft K and extend downwardly outside of the disk $g$ on the shaft K' and embrace the same. Opposite this overlapping point there are guide-rolls $s'$, supported on adjustable brackets $s$, the same being adjustable to and from the disks $g'$ by set-screws $r'$. (See Fig. 8.) The brackets $s$, carrying the rollers $s'$, fit into guideways in a bracket $r$, which is suitably supported on the main brackets J J. The object of this is to avoid the necessity of clamping the cutting-disks to hold them in position, as under such circumstances the slightest warp of the disks causes them to bind, and by this means they play freely between each other, and the tension on the same to secure the best cutting effect is accomplished by the guides which I have mentioned. Supported on the bracket $h$ and extending between the disks $g\ g$ on both shafts K and K' are fingers $h''\ h''$, which prevent the fiber from being carried around and compels the same to be delivered at the rear of the machine, where it is taken up by an attendant. Additional fingers $i'$ are supported on a bracket $i$, extend well in toward the center, and serve to remove any particles which may pass the fingers $h''$ and discharge them from between the cutting-disks. Similar fingers $h'$ on the bracket $h$ serve the same function for the disks $g$ of the shaft K. (See Figs. 4 and 5.)

I have thus described the various parts of my machine in detail. I have illustrated gearings for connecting to the two ends of the machine independently. This, however, is not a necessity, as they can be obviously coupled together. I, however, prefer to operate them in the manner here shown. I have shown cog-gears and sprocket-gears for the actuation, but of course any suitable gearing or connection might be made use of.

I desire to state that the details of the structure, while they are, I believe, in the best possible form for securing the best results and possess great merits in themselves, can be greatly varied without departing from the main feature of my invention. For instance, I have shown the splitting-knife with the guides in what I consider the best and most perfect form with the best means for holding the same in position, but this could undoubtedly be modified. I show the guide for holding the split quills against the emery-wheel with a removable steel part, which has great advantage; but this could be made of a single piece. The structure for splitting the quills and delivering them to the emery-wheel might be very satisfactory by itself, where it is desired not to reduce the quill to fiber. By very careful adjustment the feed-rolls I I'' could probably be omitted, but they serve a very useful function and avoid great accuracy in workmanship or a great variety of adjustments. The particular means I have shown for guiding the cutting-disks in the fibering-machine could be used in a fibering-machine independent of the other parts. Further, it does not matter how the various parts of the machine are supported so long as they are brought in the proper relation to each other.

Having thus described my invention, what I claim as new, and desire to secure by Letters Patent, is—

1. In a machine of the class described, the combination of a suitable base; a bracket B thereon; a pair of feed-rolls supported by said bracket; a throat-piece B' through which the quills are introduced; a knife for splitting the quills supported back of said feed-rolls; guide-tubes E', E'' to receive the halves of the split quill and turn the same with the pith downward; a pair of feed-rolls to carry the divided quill forward; an emery or other grinding wheel supported on a bracket F; a guide and shield over the top of the same with a removable steel pin G'' for bringing the pith side of the divided quills into close contact with the grinding-wheel; a delivery-tube from the said shield; feed-rolls beyond the same; and slitting-disks intermeshing with each other to receive the quill beyond the feed-rolls and slit it into fiber, all coacting substantially as described, for the purpose specified.

2. In a machine of the class described, the combination of feed-rolls with a splitting-knife beyond the same; guides for turning the divided quill so that the pith side of each part will be in the same direction; feed-rolls for carrying the quill forward; a grinding-wheel with suitable guides in proximity thereto for removing the pith from said quills; a discharge-tube from the said grinding-wheel; slitting-disks beyond the same; and suitable feed-rolls for delivering the quill to the slitting-disks, coacting for the purpose specified.

3. In a machine of the class described, the combination of feed-rolls; a splitting-knife in proximity thereto; guides for receiving the halves of the quills, one of which at least, is spiral in formation to turn the parts of the quills so that the pith side will face in the same direction; feed-rolls for carrying the divided quills forward; a grinding-wheel beyond the last-named feed-rolls for grinding the pith from said quills coacting as specified.

4. The combination of a pair of feed-rolls; a block D in proximity to said feed-rolls having a throat across the same; a knife supported on said block D; a cap-block D' with a throat d' therethrough to fit upon and retain the knife in position, coacting for the purpose specified.

5. The combination of the grinding-wheel; a shield or guide fitting loosely over the same and a projecting portion coming into close proximity to the wheel whereby quills coming in contact with the same will have the pith quickly removed without injury to the quill and the quill will be passed on over the same.

6. In a machine of the class described, the combination of a grinding-wheel F''' on a suitable support; a guide or shield G over the same having a removable pin G'' in close proximity to the wheel, for the purpose specified.

7. In a machine of the class described, the combination of parallel shafts; disks $g, g$, on said shafts intermeshing with each other; heavy disks $g'$ to each side; and roller-guides $s$ for holding the disks $g'$ in proper relation to cause the slitting-disks to be properly spaced without clamping the same separately, coacting for the purpose specified.

8. In a machine of the class described, the combination of parallel shafts; disks $g, g$, on said shafts intermeshing with each other; heavy disks $g'$ to each side; and guides for holding the disks $g'$ in proper relation to cause the slitting-disks to be properly spaced without clamping the same separately coacting for the purpose specified.

In witness whereof I have hereunto set my hand and seal in the presence of two witnesses.

WILLIAM WEBSTER. [L. S.]

Witnesses:
G. A. MARQUARDT,
HERMAN F. WAGNER.